(12) United States Patent
Makino et al.

(10) Patent No.: US 12,153,294 B2
(45) Date of Patent: Nov. 26, 2024

(54) OPTICAL DEVICE HAVING DUAL WAVEGUIDES WITH ONE BEING AN ELECTRO-OPTIC CRYSTAL WAVEGUIDE

(71) Applicant: FUJITSU OPTICAL COMPONENTS LIMITED, Kawasaki (JP)

(72) Inventors: Shuntaro Makino, Kawasaki (JP); Teruo Kurahashi, Isehara (JP); Yoshinobu Kubota, Yokohama (JP); Yoshihiko Yoshida, Sapporo (JP); Nobuaki Mitamura, Saitama (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 255 days.

(21) Appl. No.: 17/947,657

(22) Filed: Sep. 19, 2022

(65) Prior Publication Data
US 2023/0161184 A1 May 25, 2023

(30) Foreign Application Priority Data

Nov. 19, 2021 (JP) .................. 2021-188354

(51) Int. Cl.
*G02F 1/035* (2006.01)
(52) U.S. Cl.
CPC .................. *G02F 1/035* (2013.01)
(58) Field of Classification Search
CPC .......... G02F 1/035; G02F 1/212; G02F 1/225; G02F 1/0305; G02F 1/0316
See application file for complete search history.

(56) References Cited

U.S. PATENT DOCUMENTS

| | | | | |
|---|---|---|---|---|
| 6,778,726 | B2 * | 8/2004 | Kato | G02F 1/313 385/11 |
| 8,244,075 | B2 * | 8/2012 | Sugiyama | G02F 1/035 385/2 |
| 9,897,825 | B2 * | 2/2018 | Katou | G02F 1/0327 |
| 10,185,165 | B2 * | 1/2019 | Hosokawa | G02F 1/225 |
| 10,698,289 | B2 * | 6/2020 | Oisha | G02F 1/2255 |
| 10,754,179 | B2 * | 8/2020 | Ohmori | G02F 1/225 |
| 11,086,149 | B2 * | 8/2021 | Iwatsuka | G02F 1/225 |
| 11,936,428 | B2 * | 3/2024 | Makino | G02F 1/035 |
| 12,019,349 | B2 * | 6/2024 | Sugiyama | G02F 1/2255 |
| 2003/0179976 | A1 * | 9/2003 | Kato | G02F 1/313 385/16 |

(Continued)

FOREIGN PATENT DOCUMENTS

JP 2011-102891 5/2011

*Primary Examiner* — Andrew Jordan
(74) *Attorney, Agent, or Firm* — STAAS & HALSEY LLP

(57) ABSTRACT

An optical device includes a substrate, a first cladding layer that is laminated on one surface of the substrate, and a first optical waveguide that is formed in the first cladding layer at a side opposite to the substrate in the first cladding layer. The optical device further includes an electro-optic crystal layer that is laminated on a surface of the first cladding layer at a side opposite to the substrate, and a second optical waveguide that is formed of the electro-optic crystal layer on a surface of the electro-optic crystal layer at a side opposite to the first cladding layer. The optical device further includes a second cladding layer that is laminated on a surface of the electro-optic crystal layer at a side opposite to the first cladding layer.

10 Claims, 16 Drawing Sheets

(56) References Cited

U.S. PATENT DOCUMENTS

| | | | |
|---|---|---|---|
| 2011/0019956 A1* | 1/2011 | Sugiyama | G02F 1/035 |
| | | | 385/2 |
| 2017/0276972 A1* | 9/2017 | Katou | G02F 1/035 |
| 2019/0302566 A1* | 10/2019 | Oishi | G02F 1/2255 |
| 2020/0041824 A1* | 2/2020 | Ohmori | G02F 1/035 |
| 2020/0150467 A1 | 5/2020 | Eltes et al. | |
| 2020/0310216 A1* | 10/2020 | Iwatsuka | G02F 1/2255 |
| 2021/0356836 A1* | 11/2021 | Sugiyama | G02F 1/2255 |
| 2022/0082876 A1* | 3/2022 | Sugiyama | G02F 1/035 |
| 2022/0291567 A1* | 9/2022 | Sugiyama | G02F 1/212 |
| 2022/0373828 A1* | 11/2022 | Yoshida | G02F 1/0316 |
| 2023/0004028 A1* | 1/2023 | Makino | G02F 1/0353 |
| 2023/0046400 A1* | 2/2023 | Sugiyama | G02F 1/212 |
| 2023/0115362 A1* | 4/2023 | Nagase | G02F 1/035 |
| | | | 385/2 |
| 2023/0141163 A1* | 5/2023 | Makino | H04B 10/25 |
| | | | 398/115 |
| 2023/0152611 A1* | 5/2023 | Thompson | C23C 14/08 |
| | | | 385/2 |
| 2023/0161184 A1* | 5/2023 | Makino | G02F 1/2255 |
| | | | 385/2 |

\* cited by examiner

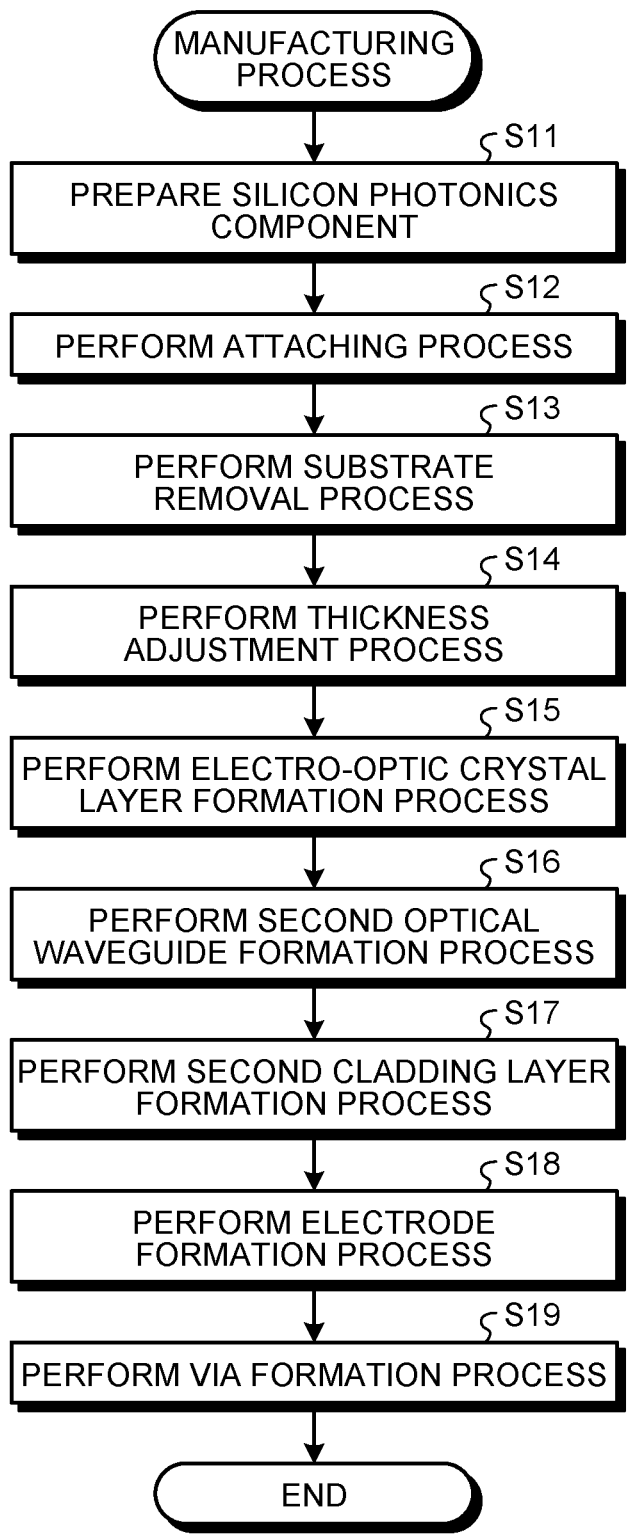

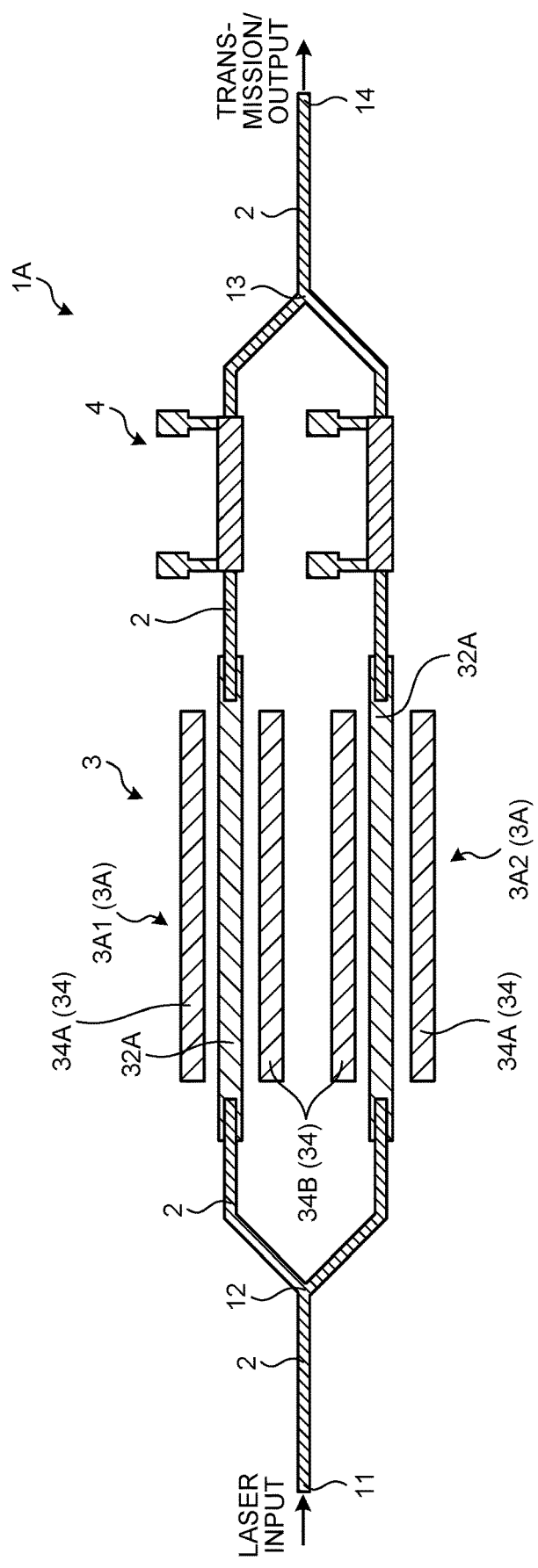

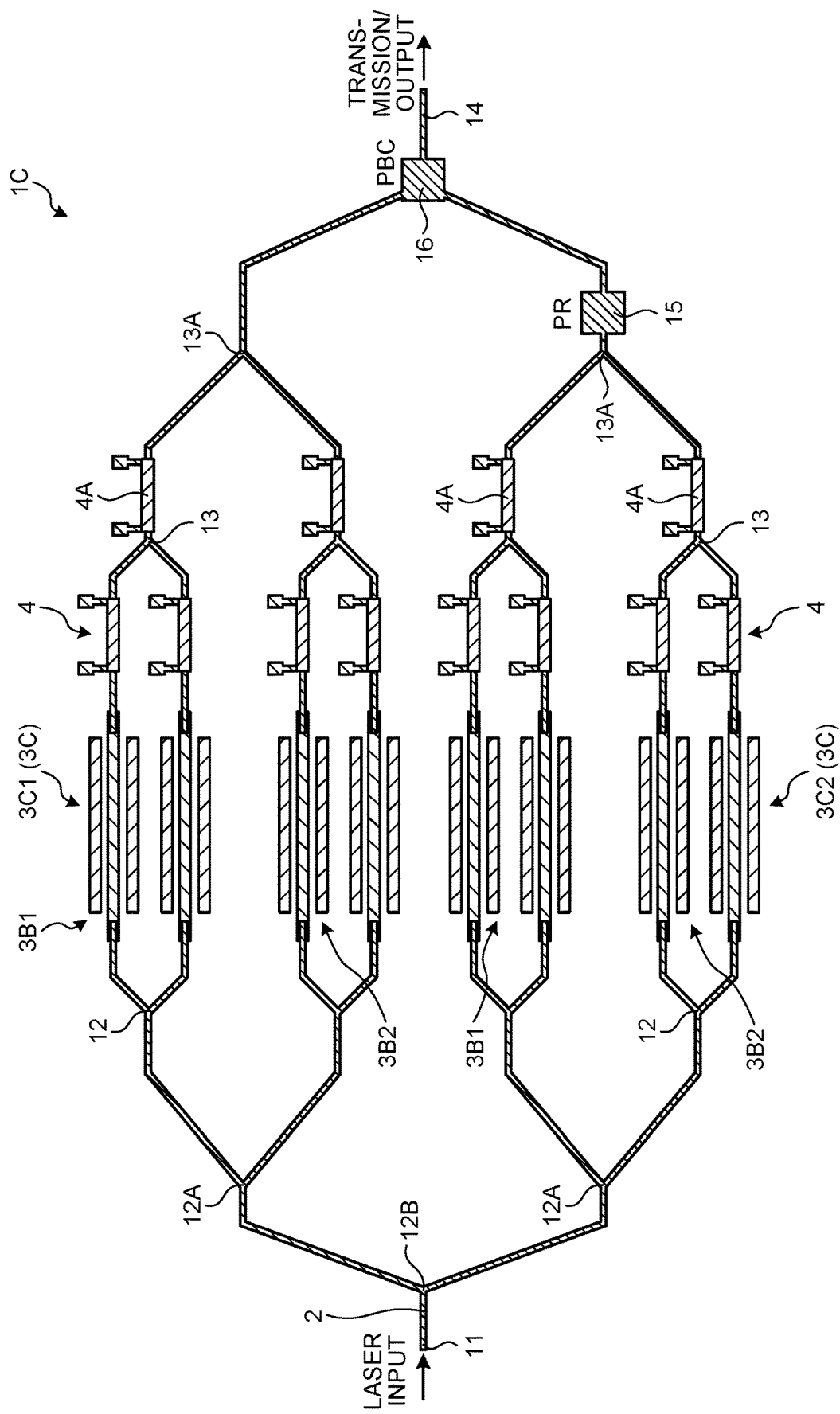

OPTICAL DEVICE HAVING DUAL WAVEGUIDES WITH ONE BEING AN ELECTRO-OPTIC CRYSTAL WAVEGUIDE

CROSS-REFERENCE TO RELATED APPLICATION

This application is based upon and claims the benefit of priority of the prior Japanese Patent Application No. 2021-188354, filed on Nov. 19, 2021, the entire contents of which are incorporated herein by reference.

FIELD

The embodiment discussed herein is related to an optical device.

BACKGROUND

A silicon photonics component is able to strongly confine light in a minute area due to a large refractive index difference between a core and a clad, and therefore is effective to achieve downsizing and high integration of various silicon optical elements, such as an optical modulator, a light receiving element, a phase control element, or a polarization multiplexer/demultiplexer. However, a general silicon optical modulator is, for example, a carrier control type with doped PN junction, and therefore, there is a problem in further expanding a modulation bandwidth.

To cope with this, for example, an optical modulator using an electro-optic crystal, such as lithium niobate ($LiNbO_3$: LN), with an electro-optic effect is able to expand the modulation bandwidth and prevent an absorption loss, so that it is possible to realize a high-performance optical modulator. However, it is difficult to integrate a silicon optical element, such as a light receiving element, a phase control element, or a polarization multiplexer/demultiplexer, other than the optical modulator into an electro-optic crystal.

Therefore, in recent years, a hybrid optical device, in which a silicon photonics component and a crystal with the electro-optic effect are combined, is attracting attention. In the hybrid optical device, an optical device that realizes high integration of the silicon photonics component and high modulation characteristics of the crystal with the electro-optic effect is demanded.

In a conventional optical device, an electro-optic crystal layer with the electro-optic effect is laminated on a buffer layer in a silicon photonics component that is formed in advance, an optical waveguide made of an electro-optic crystal is formed on the electro-optic crystal layer, and a cladding layer is laminated on the electro-optic crystal layer. Further, an electrode is arranged on the cladding layer, so that the optical modulator with the electro-optic crystal can be formed.

Patent Literature 1: U.S. Unexamined Patent Application Publication No. 2020/0150467
Patent Literature 2: Japanese Laid-open Patent Publication No. 2011-102891

In the conventional optical device that is laminated on the electro-optic crystal layer on the silicon photonics component, a first optical waveguide is formed on an intermediate layer in the silicon photonics component, and a second optical waveguide is formed on the electro-optic crystal layer. However, if a distance between the intermediate layer on which the first optical waveguide is formed and the electro-optic crystal layer on which the second optical waveguide is formed is excessively increased, it becomes difficult to optically couple the first optical waveguide and the second optical waveguide, so that an optical loss occurs due to deterioration of optical coupling characteristics.

SUMMARY

According to an aspect of an embodiment, an optical device includes a substrate, a first cladding layer that is laminated on one surface of the substrate, and a first optical waveguide that is formed in the first cladding layer at a side opposite to the substrate in the first cladding layer. The optical device further includes an electro-optic crystal layer that is laminated on a surface of the first cladding layer at a side opposite to the substrate, a second optical waveguide that is formed of the electro-optic crystal layer on a surface of the electro-optic crystal layer at a side opposite to the first cladding layer, and a second cladding layer that is laminated on a surface of the electro-optic crystal layer at a side opposite to the first cladding layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating an example of a process of manufacturing the optical device;

FIG. 11A is a schematic plan view illustrating an example of a configuration of an optical modulator;

FIG. 11C is a schematic plan view illustrating an example of a configuration of a DP-IQ optical modulator;

DESCRIPTION OF EMBODIMENT

[a] Comparative Example

Figure 12:
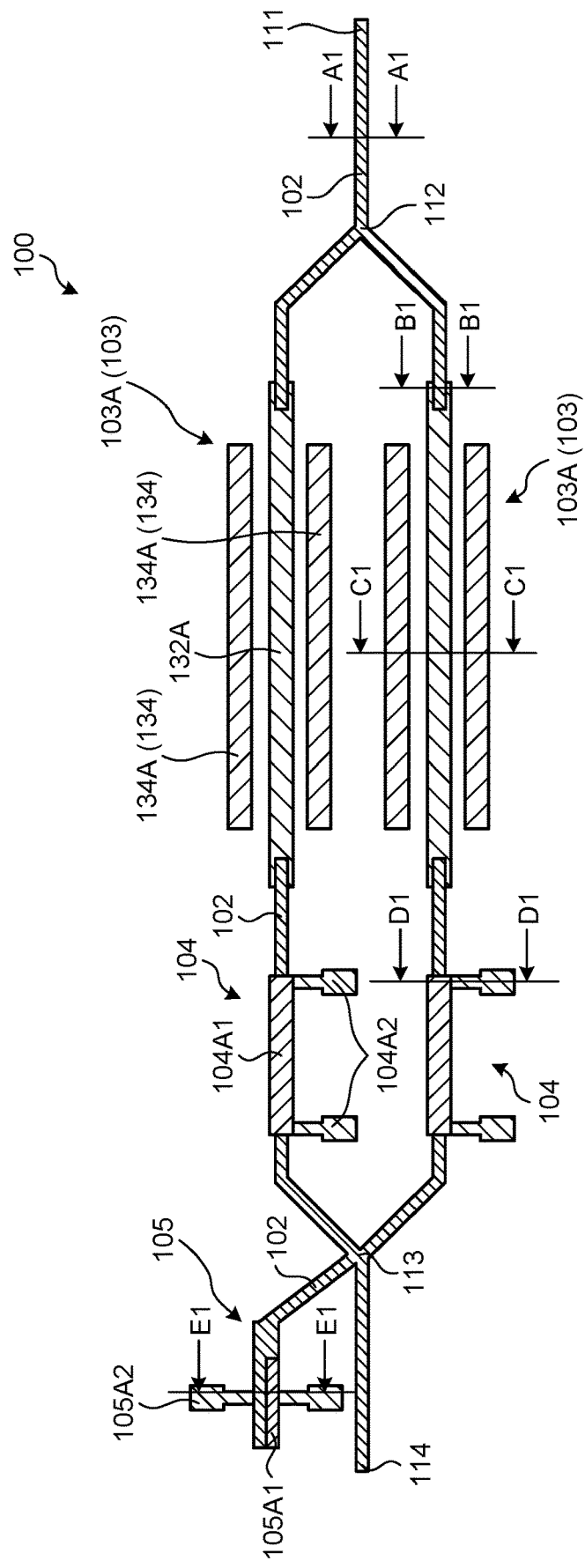
FIG. 12 is a schematic plan view illustrating an example of a configuration of an optical device according to a comparative example.

FIG. 12 is a schematic plan view illustrating an example of a configuration of an optical device 100 according to a comparative example. The optical device 100 illustrated in FIG. 12 includes an input unit 111, a first optical waveguide 102, a branching unit 112, two optical modulators 103, two phase control elements 104, a multiplexing unit 113, an output unit 114, and a light receiving element 105.

The input unit 111 inputs signal light from a light source (not illustrated) to the first optical waveguide 102. The first optical waveguide 102 is, for example, a silicon optical waveguide through which the signal light coming from the input unit 111 passes.

The optical modulators 103 are, for example, LN modulators. The optical modulators 103 are, for example, Mach-Zehnder modulators that include the branching unit 112, two Mach-Zehnder interferometers 103A, and the multiplexing unit 113, and optically modulate optically-split signal light that comes from the first optical waveguide 102 in accordance with an electrical signal. The branching unit 112 optically splits the signal light coming from the first optical waveguide 102 into light for the two first optical waveguides 102, and outputs the optically-split signal light to each of the Mach-Zehnder interferometers 103A. Each of the Mach-Zehnder interferometers 103A includes, for example, a second optical waveguide 132A that is made of an electro-optic crystal, such as LN, and an electrode 134. The electrode 134 includes a signal electrode 134A and a ground electrode 134B. Each of the Mach-Zehnder interferometers 103A generates an electric field from the signal electrode 134A to the ground electrode 134B in accordance with an electrical signal applied to the signal electrode 134A, changes an optical refractive index of the second optical waveguide 132A in accordance with the electrical field, and adjusts a phase of light that passes through the second optical waveguide 132A in accordance with the change of the optical refractive index. Each of the Mach-Zehnder interferometers 103A outputs the light for which the phase has been adjusted to each of the phase control elements 104.

The multiplexing unit 113 multiplexes the signal light that comes from each of the phase control elements 104 and that is subjected to phase shift, and outputs the multiplexed signal light to the output unit 114 via the first optical waveguide 102.

Each of the phase control elements 104 is a silicon component that shifts a phase of the signal light that has been subjected to optical modulation by the optical modulators 103. The phase control elements 104 output the signal light that has been subjected to phase shift to the multiplexing unit 113 via the first optical waveguides 102. The multiplexing unit 113 multiplexes the signal light that comes from each of the phase control elements 104 and that is subjected to phase shift, and outputs the multiplexed signal light to the output unit 114 via the first optical waveguide 102. The output unit 114 is connected to an optical fiber (not illustrated) and outputs the multiplexed signal light that comes from the first optical waveguides 102. Further, the light receiving element 105 is a silicon component that converts a part of the signal light, which is an output of the multiplexing unit 113, to an electrical signal.

Meanwhile, for example, a silicon photonics component 120 is provided in which the input unit 111, the first optical waveguide 102, the branching unit 112, the two phase control elements 104, the multiplexing unit 113, the output unit 114, and the light receiving element 105 in the optical device 100 are integrated. Meanwhile, the silicon photonics component 120 is a component that is formed in advance.

Figure 13:
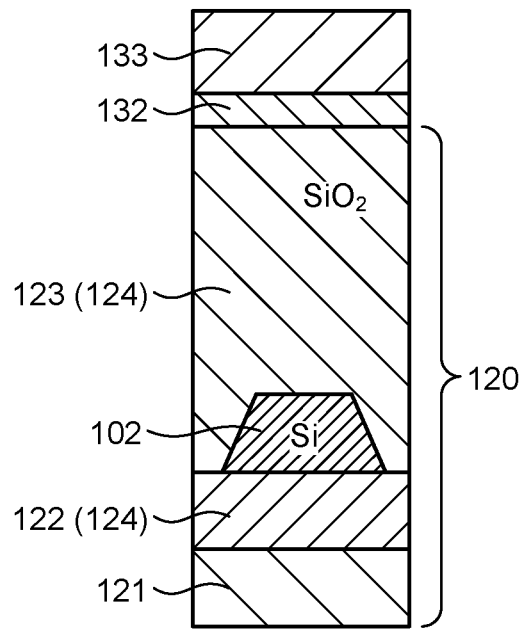
FIG. 13 is a schematic cross-sectional view illustrating an example of a cross-sectional part cut along a line A1-A1 in FIG. 12.

FIG. 13 is a schematic cross-sectional view illustrating an example of a cross-sectional part cut along a line A1-A1 in FIG. 12. The A1-A1 cross-sectional part as illustrated in FIG. 13 includes the silicon photonics component 120, an electro-optic crystal layer 132, and a second cladding layer 133.

The silicon photonics component 120 includes a first substrate 121, a first cladding layer 124 that is laminated on the first substrate 121, and the first optical waveguide 102 that is formed in the first cladding layer 124. The first substrate 121 has resistivity of smaller than 1000 Ωcm, for example. The first cladding layer 124 includes an intermediate layer 122 that is laminated on the first substrate 121, the first optical waveguide 102 that is formed in the intermediate layer 122, and a buffer layer 123 that is laminated on the intermediate layer 122. The electro-optic crystal layer 132 is a layer that is laminated on the buffer layer 123 in the silicon photonics component 120 and that is made of LN or the like with an electro-optic effect, for example. The second cladding layer 133 is a layer that is laminated on the electro-optic crystal layer 132 and made of $SiO_2$ or the like, for example.

Figure 14:
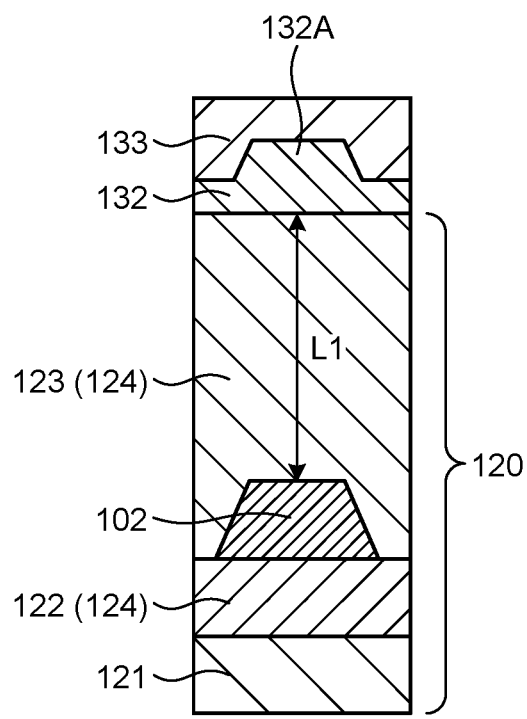
FIG. 14 is a schematic cross-sectional view illustrating an example of a cross-sectional part cut along a line B1-B1 in FIG. 12.

FIG. 14 is a schematic cross-sectional view illustrating an example of a cross-sectional part cut along a line B1-B1 in FIG. 12. The B1-B1 cross-sectional part as illustrated in FIG. 14 includes the first substrate 121, the intermediate layer 122, the first optical waveguide 102, the buffer layer 123, the electro-optic crystal layer 132, the second optical waveguide 132A that is formed on the electro-optic crystal layer 132, and the second cladding layer 133. The second optical waveguide 132A is an LN optical waveguide that is formed of the electro-optic crystal layer 132. The first optical waveguide 102 and the second optical waveguide 132A are optically coupled.

Figure 15:
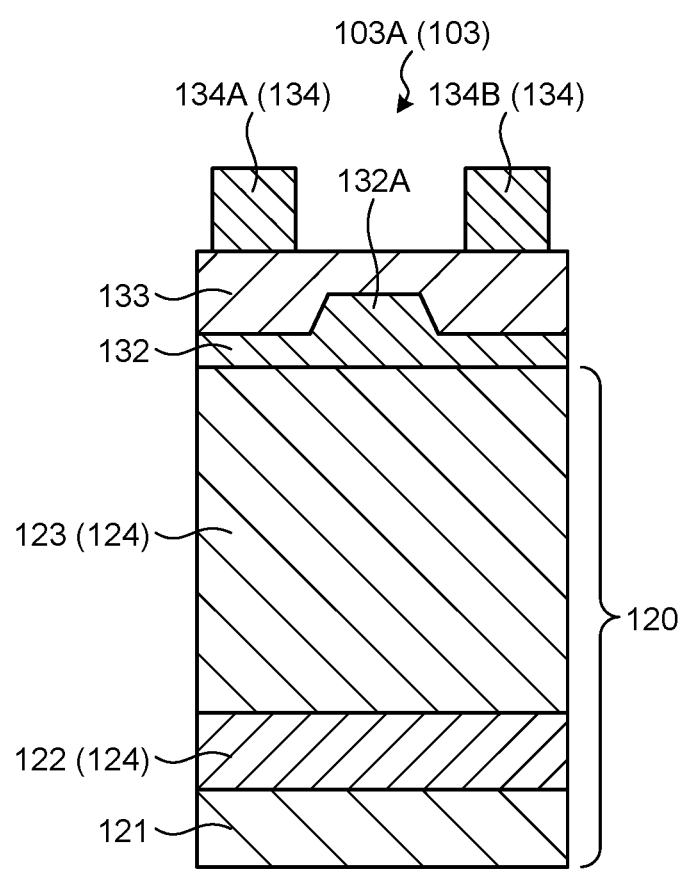
FIG. 15 is a schematic cross-sectional view illustrating an example of a cross-sectional part (Mach-Zehnder interferometer) cut along a line C1-C1 in FIG. 12.

FIG. 15 is a schematic cross-sectional view illustrating an example of a cross-sectional part (the Mach-Zehnder interferometer 103A) cut along a line C1-C1 in FIG. 12. The C1-C1 cross-sectional part as illustrated in FIG. 15 is a cross-sectional part of the Mach-Zehnder interferometer 103A in the optical modulators 103. The C1-C1 cross-sectional part includes the first substrate 121, the intermediate layer 122, the buffer layer 123, the electro-optic crystal layer 132, the second optical waveguide 132A, the second cladding layer 133, and the electrode 134 that is formed on the second cladding layer 133. The electrode 134 includes the signal electrode 134A and the ground electrode 134B. Each of the Mach-Zehnder interferometers 103A changes the optical refractive index of the second optical waveguide 132A in accordance with an electric field generated from the signal electrode 134A to the ground electrode 134B depending on an electrical signal applied to the signal electrode 134A, and optically modulates signal light that passes through the second optical waveguide 132A in accordance with the change of the optical refractive index.

Figure 16:
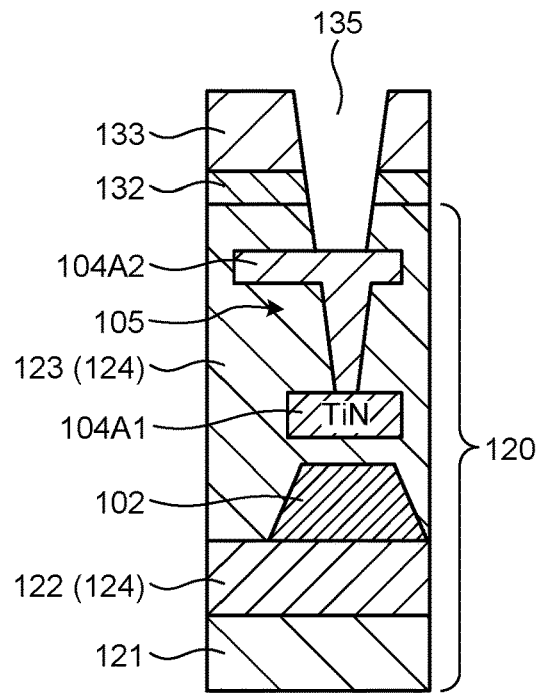
FIG. 16 is a schematic cross-sectional view illustrating an example of a cross-sectional part (phase control element) cut along a line D1-D1 in FIG. 12.

FIG. 16 is a schematic cross-sectional view illustrating an example of a cross-sectional part cut along a line D1-D1 (phase control elements 104) in FIG. 12. The D1-D1 cross-sectional part as illustrated in FIG. 16 includes the first substrate 121, the intermediate layer 122, the first optical waveguide 102, the buffer layer 123, the phase control element 104 that is formed in the vicinity of the first optical waveguide 102 in the buffer layer 123, the electro-optic crystal layer 132, and the second cladding layer 133. A via 135 that exposes a metal wire 104A2 in the phase control element 104 is formed in the second cladding layer 133, the electro-optic crystal layer 132, and the buffer layer 123.

The phase control element 104 includes a thermo-optical heater 104A1 that is an electrical resistance made of TiN or the like and arranged above the first optical waveguide 102, and the metal wire 104A2 that is electrically connected to the thermo-optical heater 104A1 and supplies an electric current to the thermo-optical heater 104A1. The thermo-optical heater 104A1 generates heat by causing an electric current to flow from the metal wire 104A2 to the thermo-optical heater 104A1. The phase control element 104 shifts a phase of light that passes through the inside of the first optical waveguide 102, due to a change of a silicon refractive index inside the first optical waveguide 102 by the heat of the thermo-optical heater 104A1.

Figure 17:
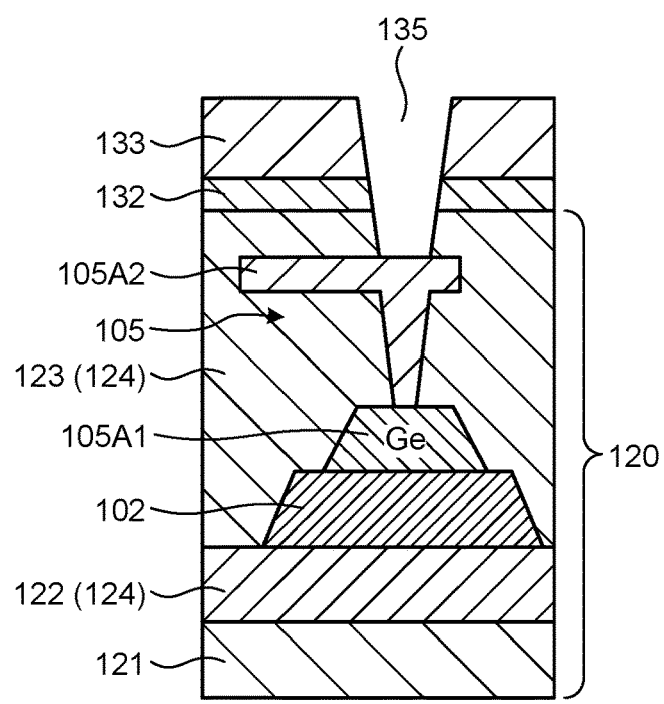
FIG. 17 is a schematic cross-sectional view illustrating an example of a cross-sectional part (light receiving element) cut along a line E1-E1 in FIG. 12.

FIG. 17 is a schematic cross-sectional view illustrating an example of a cross-sectional part (the light receiving element 105) cut along a line E1-E1 in FIG. 12. The E1-E1 cross-sectional part as illustrated in FIG. 17 includes the first substrate 121, the intermediate layer 12, the first optical waveguide 102, the buffer layer 123, the light receiving element 105 that is formed on the first optical waveguide 102 in the buffer layer 123, the electro-optic crystal layer 132, and the second cladding layer 133. The via 135 that exposes a metal wire 105A2 in the light receiving element 105 is formed in the second cladding layer 133, the electro-optic crystal layer 132, and the buffer layer 123.

The light receiving element 105 includes a photoelectric conversion element 105A1 that is made of Ge or the like and arranged on the first optical waveguide 102, and the metal wire 105A2 that is connected to the photoelectric conversion element 105A1 and outputs an electrical signal from the photoelectric conversion element 105A1. The light receiving element 105 converts signal light that passes through the first optical waveguide 102 to an electrical signal via the photoelectric conversion element 105A1, and outputs the electrical signal to a monitor (not illustrated) via the metal wire 105A2.

In the optical device 100 of the comparative example, the electro-optic crystal layer 132 is laminated on the buffer layer 123 in the silicon photonics component 120 that is formed in advance, the second optical waveguide 132A is formed on the electro-optic crystal layer 132, and the second cladding layer 133 is laminated on the electro-optic crystal layer 132. Further, the electrode 134 is arranged on the second cladding layer 133, so that the optical modulators 103 with the electro-optic crystal can be formed.

In the optical device 100 that is laminated on the electro-optic crystal layer 132 on the silicon photonics component 120, the first optical waveguide 102 is formed on the intermediate layer 122 in the silicon photonics component 120, and the second optical waveguide 132A is formed on the electro-optic crystal layer 132. However, for example, when focus is given to the light receiving element 105 and the phase control elements 104, and if a distance L1 between the intermediate layer 122 on which the first optical waveguide 102 is formed and the electro-optic crystal layer 132 on which the second optical waveguide 132A is formed is excessively increased, it becomes difficult to optically couple the first optical waveguide 102 and the second optical waveguide 132A, so that an optical loss occurs due to deterioration of optical coupling characteristics.

Furthermore, in the optical modulators 103, the resistivity of the first substrate 121 in the silicon photonics component 120 is smaller than 1000 Ωcm, so that a modulation bandwidth of the optical modulators 103 is deteriorated.

Therefore, there is a need to provide an optical device according to a present embodiment, in which it is possible to stabilize optical coupling performance by reducing a distance between an electro-optic crystal layer on which a second optical waveguide is formed and a first optical waveguide that is formed on an intermediate layer, and it is possible to prevent deterioration of the modulation bandwidth of an optical modulator.

An embodiment of the optical device or the like disclosed in the present application will be described in detail below with reference to the drawings. The present invention is not limited by the embodiment below.

[b] Embodiment

Figure 1:
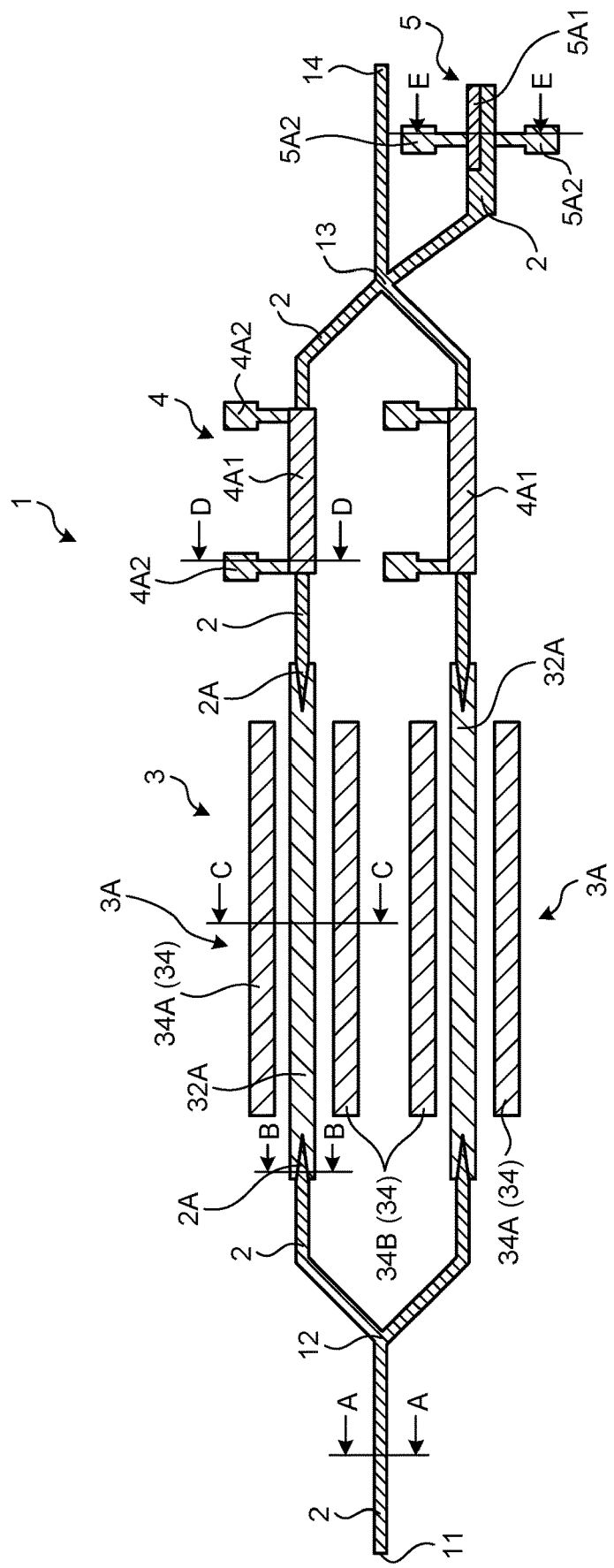
FIG. 1 is a schematic plan view illustrating an example of a configuration of an optical device according to a present embodiment.

FIG. 1 is a schematic plan view illustrating an example of an optical device 1 according to the present embodiment. The optical device 1 illustrated in FIG. 1 includes an input unit 11, a first optical waveguide 2, a branching unit 12, two optical modulators 3, two phase control elements 4, a multiplexing unit 13, an output unit 14, and a light receiving element 5.

The input unit 11 inputs signal light from a light source (not illustrated) to the first optical waveguide 2. The first optical waveguide 2 is, for example, a silicon optical waveguide through which the signal light coming from the input unit 11 passes.

The optical modulators 3 are, for example, LN optical modulators made of a crystal, such as LN, with an electro-optic effect. The optical modulators 3 are, for example, Mach-Zehnder modulators that include the branching unit 12, two Mach-Zehnder interferometers 3A, and the multiplexing unit 13, and optically modulate optically-split signal light that comes from the first optical waveguide 2 in accordance with an electrical signal. The branching unit 12 optically splits the signal light coming from the first optical waveguide 2 into the two first optical waveguides 2, and outputs the optically-split signal light to each of the Mach-Zehnder interferometers 3A. Each of the Mach-Zehnder interferometers 3A includes, for example, a second optical waveguide 32A and an electrode 34. The second optical waveguide 32A is, for example, an LN optical waveguide. The electrode 34 includes a signal electrode 34A and a ground electrode 34B. Each of the Mach-Zehnder interferometers 3A generates an electric field from the signal electrode 34A to the ground electrode 34B in accordance with an electrical signal applied to the signal electrode 34A, changes an optical refractive index of the second optical waveguide 32A in accordance with the electrical field, and adjusts a phase of light that passes through the second optical waveguide 32A in accordance with the change of the optical refractive index. Each of the Mach-Zehnder interferometers 3A outputs the light for which the phase has been adjusted to each of the phase control elements 4. The multiplexing unit 13 multiplexes the signal light that comes from each of the phase control elements 4 and that is subjected to phase shift, and outputs the multiplexed signal light to the output unit 14 via the first optical waveguide 2.

Each of the phase control elements 4 is a silicon component that shifts a phase of the signal light that has been subjected to optical modulation by the optical modulators 3. The phase control elements 4 output the signal light that has been subjected to phase shift to the multiplexing unit 13 via the first optical waveguides 2. The output unit 14 is connected to an optical fiber (not illustrated) and outputs the multiplexed signal light that comes from the first optical waveguides 2. Further, the light receiving element 5 is a silicon component that electrically converts a part of the signal light that is an output of the multiplexing unit 13.

Meanwhile, for example, a silicon photonics component 20 is provided in which the input unit 11, the first optical waveguide 2, the branching unit 12, the two phase control elements 4, the multiplexing unit 13, the output unit 14, and the light receiving element 5 in the optical device 1 are integrated. Meanwhile, the silicon photonics component 20 is a component that is formed in advance.

Figure 2:
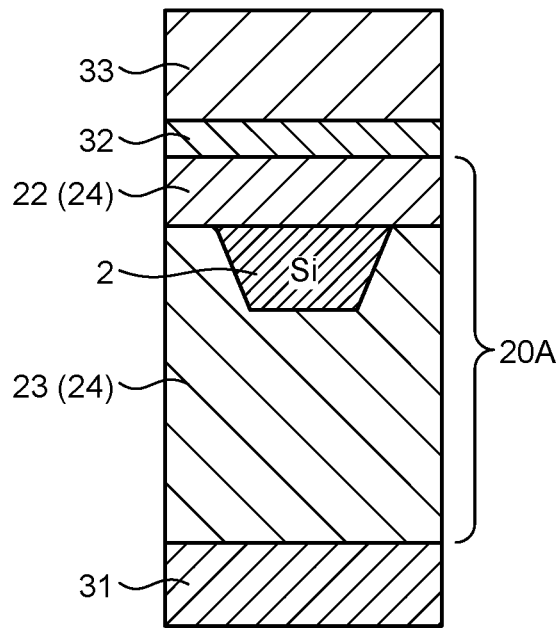
FIG. 2 is a schematic cross-sectional view illustrating an example of a cross-sectional part cut along a line A-A in FIG. 1.

FIG. 2 is a schematic cross-sectional view illustrating an example of a cross-sectional part cut along a line A1-A1 in FIG. 1. The A-A cross-sectional part as illustrated in FIG. 2 includes a second substrate 31, a silicon photonics component 20A, an electro-optic crystal layer 32, and a second cladding layer 33. The silicon photonics component 20A is the silicon photonics component 20 from which a first substrate 21 is removed.

The second substrate 31 is a substrate that has resistivity of, for example, equal to or larger than 1000 Ωcm. A thickness of the second substrate 31 is, for example, 1000 micrometers (μm). Further, the second substrate 31 is a substrate that is made of, for example, silicon, LN, or quartz. The silicon photonics component 20 includes the first substrate 21, a first cladding layer 24 that is laminated on the first substrate 21, and the first optical waveguide 2 that is formed in the first cladding layer 24. The first cladding layer 24 is made of, for example, $SiO_2$. Further, the first optical waveguide 2 is, for example, a silicon waveguide. The first optical waveguide 2 is, for example, a rib waveguide. The first optical waveguide 2 is an optical waveguide that is formed in the first cladding layer 24 at a side opposite to the second substrate 31 in the first cladding layer 24.

The first cladding layer 24 includes an intermediate layer 22 that is laminated on the first substrate 21, the first optical waveguide 2 that is formed on the intermediate layer 22, and a buffer layer 23 that is laminated on the intermediate layer 22. The buffer layer 23 is a layer that is laminated on one surface of the second substrate 31. The intermediate layer 22 is a layer that is laminated on one surface of the buffer layer 23 at a side opposite to the second substrate 31.

The second substrate 31 is in a state in which the buffer layer 23 in the silicon photonics component 20A is attached. In other words, the A-A cross-sectional part illustrated in FIG. 2 includes the second substrate 31, the buffer layer 23 that is laminated on the second substrate 31, the intermediate layer 22 which is laminated on the buffer layer 23 and in which the first optical waveguide 2 is formed, the electro-optic crystal layer 32 that is laminated on the intermediate layer 22, and the second cladding layer 33 that is laminated on the electro-optic crystal layer 32. The second cladding layer 33 is made of, for example, $SiO_2$. The second cladding layer 33 is a layer that is laminated on one surface of the electro-optic crystal layer 32 at a side opposite to the first cladding layer 24.

The first optical waveguide 2 is formed on the intermediate layer 22 at a side of the second substrate 31. The electro-optic crystal layer 32 is, for example, an X-cut LN layer. LN is an anisotropic material whose refractive index changes by application of an electric field and which has the Pockels coefficient of about 30 pm/V, for example. The electro-optic crystal layer 32 is a layer that is laminated on the first cladding layer 24 at a side opposite to the second substrate 31. The second optical waveguide 32A is an optical waveguide that is formed of the electro-optic crystal layer 32 on a surface of the electro-optic crystal layer 32 at a side opposite to the first cladding layer 24. Meanwhile, the first optical waveguide 2 and the second optical waveguide 32A have trapezoidal shapes such that respective long sides face each other across the intermediate layer 22.

The intermediate layer 22 is a layer made of $SiO_2$ with a lower optical refractive index than LN, for example. A thickness of the intermediate layer 22 between the first optical waveguide 2 and the second optical waveguide 32A is, for example, about 2 μm to 6 μm. The buffer layer 23 is a layer that is made of $SiO_2$ and that is arranged to prevent light propagating through the first optical waveguide 2 from being absorbed by the electrode 34. A thickness of the electro-optic crystal layer 32 is, for example, about 0.5 μm to 3 μm.

Figure 3:
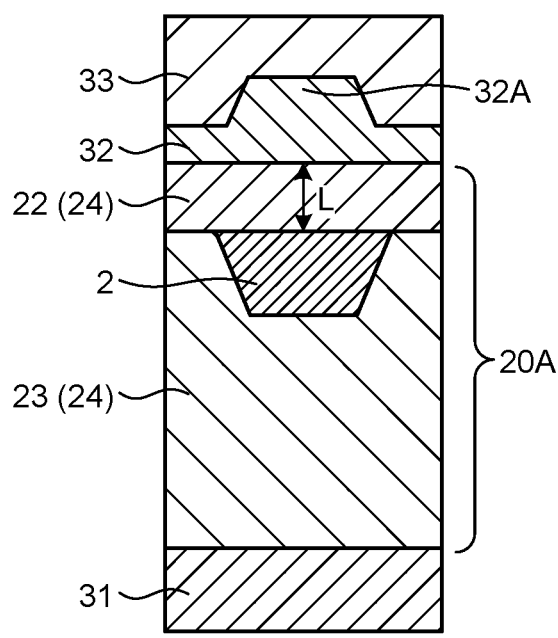
FIG. 3 is a schematic cross-sectional view illustrating an example of a cross-sectional part cut along a line B-B in FIG. 1.

FIG. 3 is a schematic cross-sectional view illustrating an example of a cross-sectional part cut along a line B-B in FIG. 1. The B-B cross-sectional part as illustrated in FIG. 3 is a coupling part 2A connecting the first optical waveguide 2 with the second optical waveguide 32A. The B-B cross-sectional part includes the second substrate 31, the buffer layer 23, the first optical waveguide 2, the intermediate layer 22, the electro-optic crystal layer 32, the second optical waveguide 32A that is formed on the electro-optic crystal layer 32, and the second cladding layer 33. The first optical waveguide 2 and the second optical waveguide 32A are optically coupled. The first optical waveguide 2 and the second optical waveguide 32A are located close to each other in a vertical direction, and the width of the first optical waveguide 2 is adiabatically reduced to weaken optical confinement such that the first optical waveguide 2 is gradually coupled with the second optical waveguide 32A, for example. Meanwhile, the thickness of the intermediate layer 22 between the first optical waveguide 2 formed on the intermediate layer 22 and the second optical waveguide 32A formed on the electro-optic crystal layer 32, that is, a distance L between the first optical waveguide 2 and the second optical waveguide 32A, is reduced.

Figure 4:
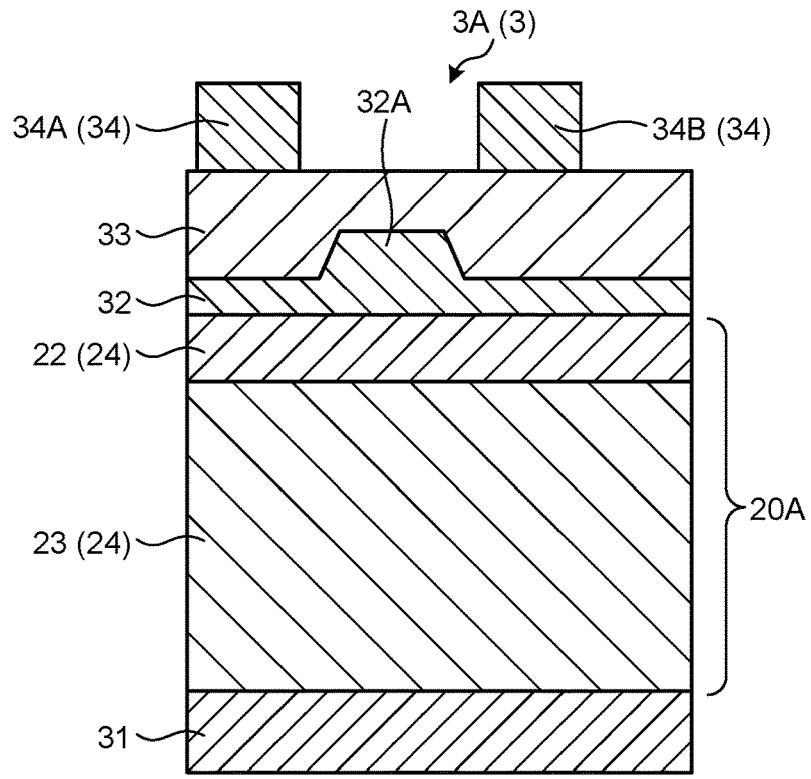
FIG. 4 is a schematic cross-sectional view illustrating an example of a cross-sectional part (Mach-Zehnder interferometer) cut along a line C-C in FIG. 1.

FIG. 4 is a schematic cross-sectional view illustrating an example of a cross-sectional part (the Mach-Zehnder interferometers 3A) cut along a line C-C in FIG. 1. The C-C cross-sectional part as illustrated in FIG. 4 is a cross-sectional part of the Mach-Zehnder interferometers 3A in the optical modulators 3. The C-C cross-sectional part includes the second substrate 31, the buffer layer 23, the intermediate layer 22, the electro-optic crystal layer 32, the second optical waveguide 32A, the second cladding layer 33, and the electrode 34 formed on the second cladding layer 33.

The electrode 34 includes the signal electrode 34A and the ground electrode 34B. The signal electrode 34A is an electrode that is made of a metal material, such as gold or copper, has a width of 2 to 10 µm, and has a thickness of 1 to 20 µm, for example. The ground electrode 34B is an electrode that is made of a metal material, such as gold or copper, and has a thickness of equal to or larger than 1 µm, for example.

If the electro-optic crystal layer 32 is an X-cut LN, a refractive index is changed by application of an electric field in a horizontal direction, and an electric field is applied from the signal electrode 34A to the ground electrode 34B in a left-right direction of the second optical waveguide 32A. Each of the Mach-Zehnder interferometers 3A changes the optical refractive index of the second optical waveguide 32A in accordance with the electric field that is applied from the signal electrode 34A to the ground electrode 34B by application of an electrical signal to the signal electrode 34A, and optically modulates signal light that passes through the second optical waveguide 32A in accordance with the change of the optical refractive index.

Figure 5:
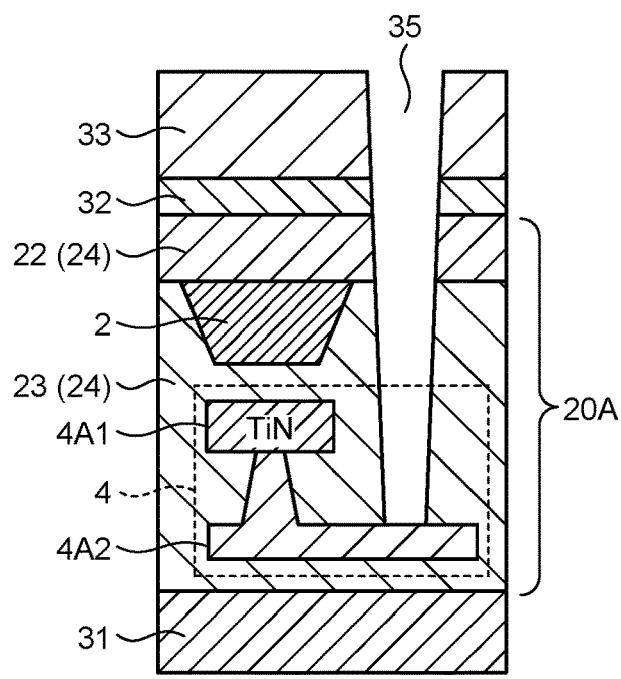
FIG. 5 is a schematic cross-sectional view illustrating an example of a cross-sectional part (phase control element) cut along a line D-D in FIG. 1.

FIG. 5 is a schematic cross-sectional view illustrating an example of a cross-sectional part (the phase control element 4) cut along a line D-D in FIG. 1. The D-D cross-sectional part as illustrated in FIG. 5 includes the second substrate 31, the buffer layer 23, the first optical waveguide 2, the intermediate layer 22, the phase control element 4 is are formed in the vicinity of the first optical waveguide 2 in the buffer layer 23, the electro-optic crystal layer 32, and the second cladding layer 33. A via 35 that exposes a metal wire 4A2 in the phase control element 4 is formed in the second cladding layer 33, the electro-optic crystal layer 32, the intermediate layer 22, and the buffer layer 23.

The phase control element 4 includes a thermo-optical heater 4A1 that is an electrical resistance made of TiN or the like and arranged at a position in the vicinity of the first optical waveguide 2, and the metal wire 4A2 that is electrically connected to the thermo-optical heater 4A1 and supplies an electric current to the thermo-optical heater 4A1. The thermo-optical heater 4A1 generates heat by causing an electric current to flow from the metal wire 4A2 to the thermo-optical heater 4A1. The phase control element 4 shifts a phase of light that passes through the inside of the first optical waveguide 2, due to a change of a silicon refractive index inside the first optical waveguide 2 by the heat of the thermo-optical heater 4A1.

Figure 6:
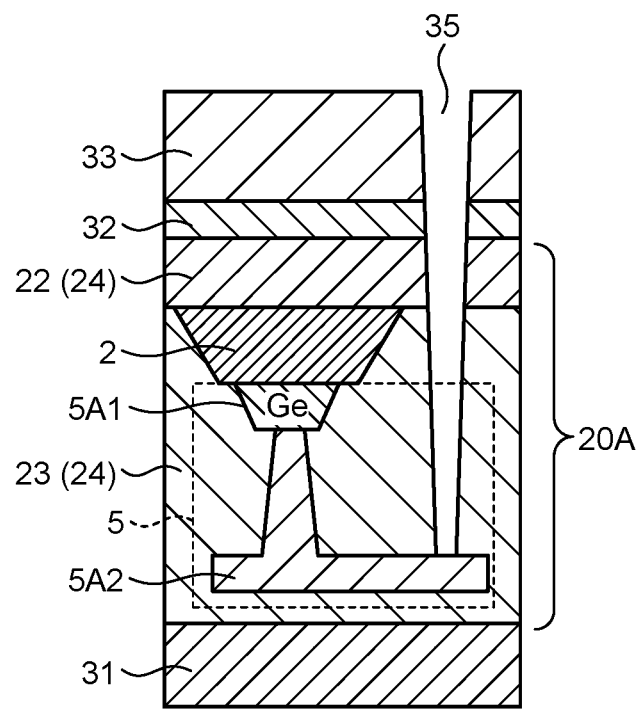
FIG. 6 is a schematic cross-sectional view illustrating an example of a cross-sectional part (light receiving element) cut along a line E-E in FIG. 1.

FIG. 6 is a schematic cross-sectional view illustrating an example of a cross-sectional part (the light receiving element 5) cut along a line E-E in FIG. 1. The E-E cross-sectional part as illustrated in FIG. 6 includes the second substrate 31, the buffer layer 23, the first optical waveguide 2, the intermediate layer 22, the light receiving element 5 that is formed in the vicinity of the first optical waveguide 2 in the buffer layer 23, the electro-optic crystal layer 32, and the second cladding layer 33. The via 35 that exposes a metal wire 5A2 in the light receiving element 5 is formed in the second cladding layer 33, the electro-optic crystal layer 32, the intermediate layer 22, and the buffer layer 23.

The light receiving element 5 includes a photoelectric conversion element 5A1 that is made of Ge or the like and arranged at a position in the vicinity of the first optical waveguide 2, and the metal wire 5A2 that is connected to the photoelectric conversion element 5A1 and outputs an electrical signal from the photoelectric conversion element 5A1. The light receiving element 5 converts signal light that passes through the first optical waveguide 2 to an electrical signal via the photoelectric conversion element 5A1, and outputs the electrical signal to a monitor (not illustrated) via the metal wire 5A2.

FIG. 7 is a flowchart illustrating an example of a process of manufacturing the optical device 1. As a manufacturing process, a preparation process of preparing the silicon photonics component 20 that is formed in advance is performed (Step S11). An attaching process of inverting the silicon photonics component 20 and attaching the second substrate 31 to a surface of the buffer layer 23 in the silicon photonics component 20 is performed (Step S12). Meanwhile, the second substrate 31 is a substrate with high resistivity of equal to or larger than 1000 Ωcm, which is higher than the first substrate 21.

After attaching the second substrate 31, a removal process of removing the first substrate 21 in the silicon photonics component 20 is performed (Step S13). A thickness adjustment process of adjusting the thickness of the intermediate layer 22 in the silicon photonics component 20A from which the first substrate 21 is removed is performed (Step S14). Meanwhile, by adjusting the thickness of the intermediate layer 22, it is possible to reduce the distance L between the second optical waveguide 32A of the electro-optic crystal layer 32 and the first optical waveguide 2 and realize highly efficient optical coupling at the time of completion.

An electro-optic crystal layer formation process of laminating the electro-optic crystal layer 32 on the intermediate layer 22 in the silicon photonics component 20A, in which the thickness of the intermediate layer 22 has been adjusted, is performed (Step S15). A second optical waveguide formation process of forming the second optical waveguide 32A on the electro-optic crystal layer 32 is performed (Step S16).

A second cladding layer formation process of forming the second cladding layer 33 on the electro-optic crystal layer 32, on which the second optical waveguide 32A has been formed, is performed (Step S17). Further, an electrode formation process of arranging the electrode 34 on the second cladding layer 33 is performed (Step S18). Furthermore, after the electrode 34 is arranged, a via formation process of forming the via 35 in the second cladding layer 33, the electro-optic crystal layer 32, and the buffer layer 23 is performed so as to expose the metal wire 4A2 of the phase control element 4 and the metal wire 5A2 of the light receiving element 5 in the buffer layer 23 (Step S19). As a result, the optical device 1 as illustrated in FIG. 10B is formed.

Figure 10A:
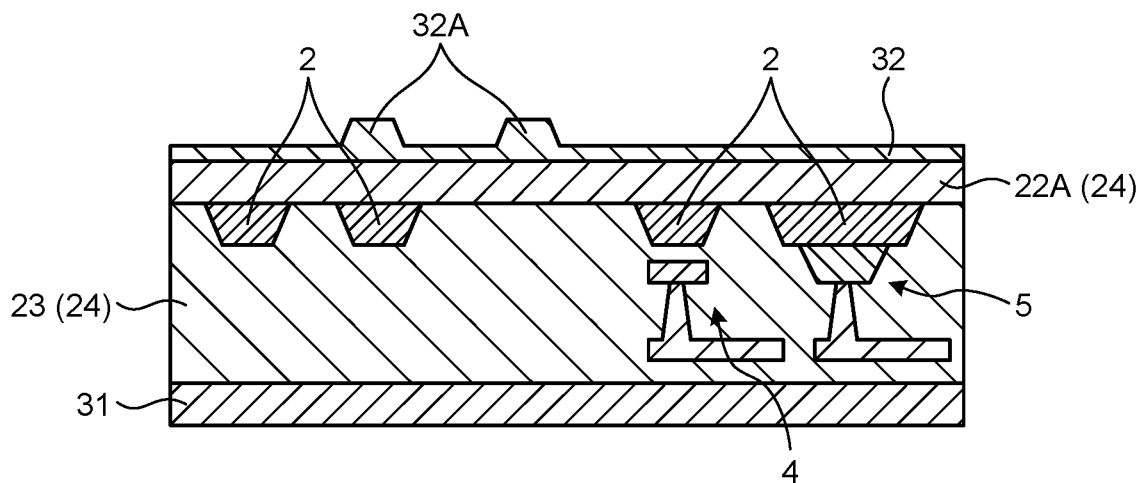
FIG. 10A is a schematic cross-sectional view illustrating an example of a second optical waveguide formation process.
Figure 10B:
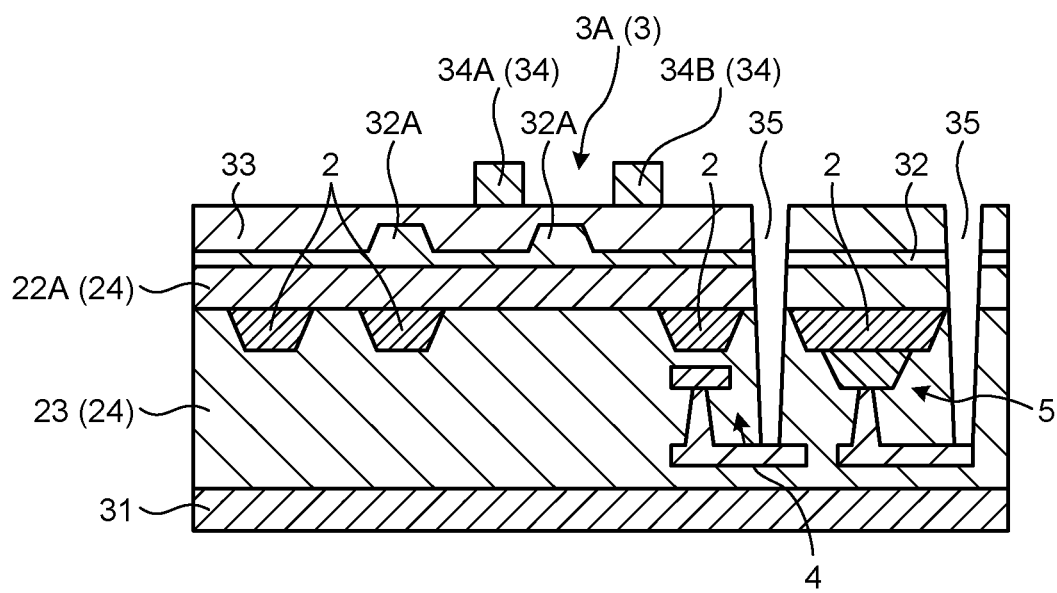
FIG. 10B is a schematic cross-sectional view illustrating an example of a second cladding layer formation process, an electrode formation process, and a via formation process.

In the optical device 1 as illustrated in FIG. 10B, the second substrate 31 with higher resistivity than the first substrate 21 is adopted, so that it is possible to avoid a situation in which the modulation bandwidth of the optical modulators 3 is deteriorated, for example. Furthermore, in the optical device 1, the thickness of the intermediate layer 22 is adjusted and the distance L between the second optical waveguide 32A in the electro-optic crystal layer 32 and the first optical waveguide 2 is reduced, so that it is possible to improve optical coupling efficiency between the first optical waveguide 2 and the second optical waveguide 32A.

Figure 8A:
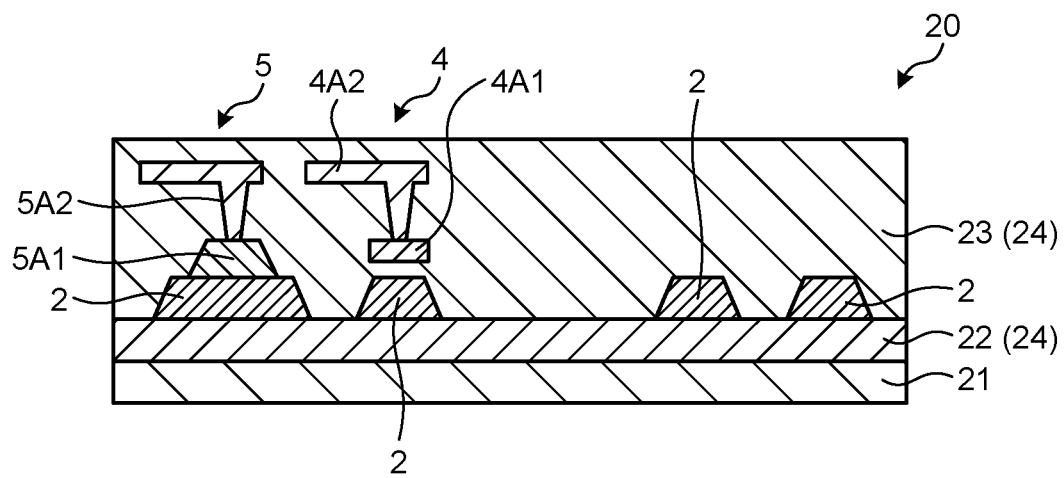
FIG. 8A is a schematic cross-sectional view illustrating an example of a configuration of a silicon photonics component.

FIG. 8A is a schematic cross-sectional view illustrating an example of a configuration of the silicon photonics component 20. The silicon photonics component 20 includes the first substrate 21, the intermediate layer 22, the plurality of first optical waveguides 2, and the buffer layer 23. The phase control element 4 and the light receiving element 5 are incorporated in the arbitrary first optical waveguides 2 in the buffer layer 23. The silicon photonics component 20 is a component that is formed in advance.

Figure 8B:
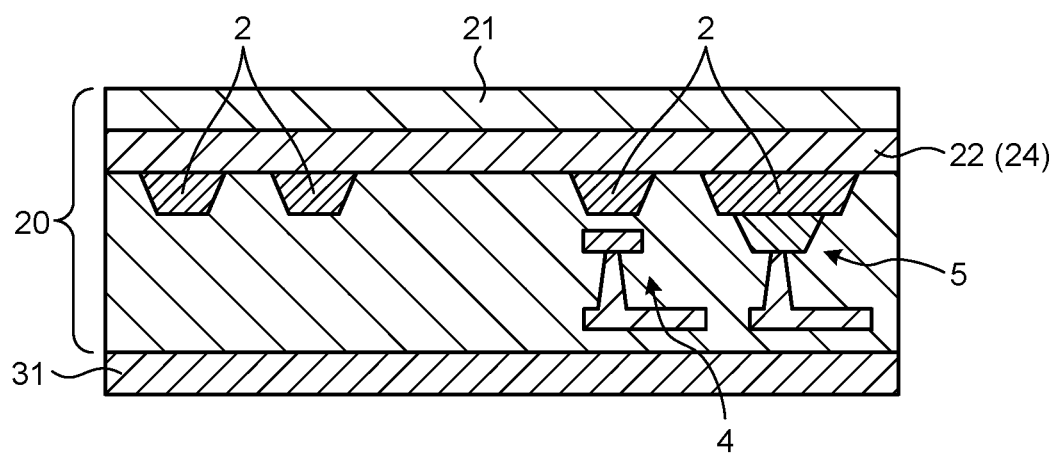
FIG. 8B is a schematic cross-sectional view illustrating an example of a attaching process.

FIG. 8B is a schematic cross-sectional view illustrating an example of the attaching process. After the silicon photonics component 20 illustrated in FIG. 8A is inverted upside down, the second substrate 31 is attached onto the buffer layer 23 of the silicon photonics component 20.

Figure 9A:
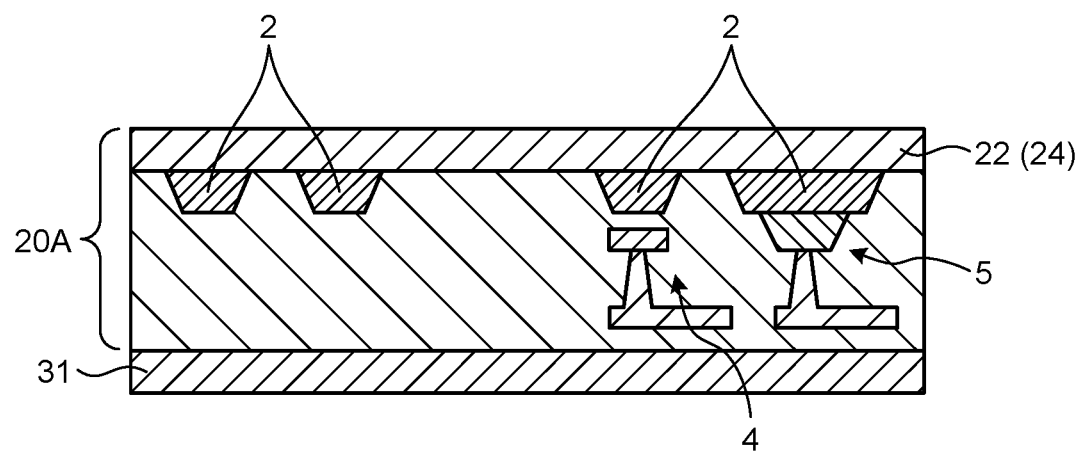
FIG. 9A is a schematic cross-sectional view illustrating an example of a substrate removal process.

FIG. 9A is a schematic cross-sectional view illustrating an example of the substrate removal process. By removing the first substrate 21 in the silicon photonics component 20 to which the second substrate 31 is attached, the silicon photonics component 20A as illustrated in FIG. 9A is formed.

Figure 9B:
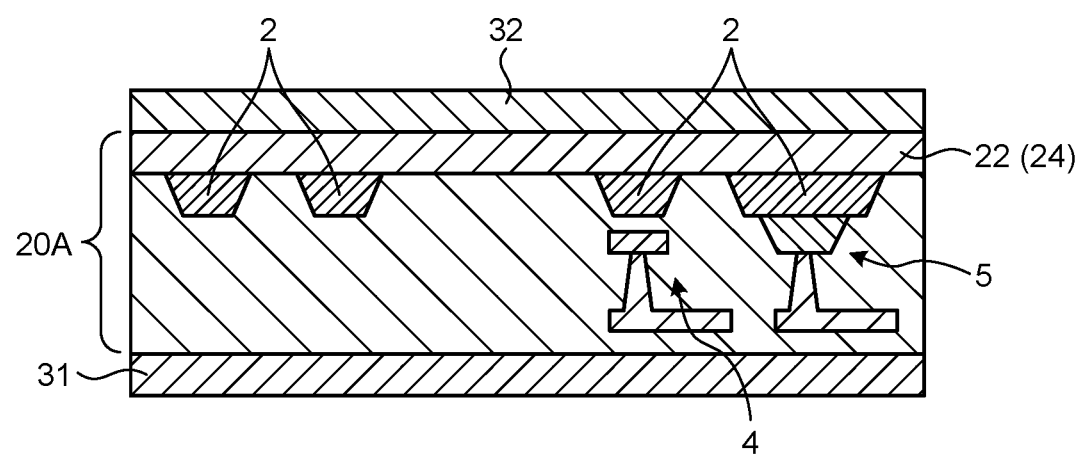
FIG. 9B is a schematic cross-sectional view illustrating an example of a thickness adjustment process and an electro-optic crystal layer formation process.

FIG. 9B is a schematic cross-sectional view illustrating an example of the thickness adjustment process and the electro-optic crystal layer formation process. The thickness of the intermediate layer 22 in the silicon photonics component 20A in which the first substrate 21 has been removed is adjusted. By adjusting the thickness of the intermediate layer 22, the distance between the first optical waveguide 2 and the second optical waveguide 32A is adjusted. Further, after the thickness of the intermediate layer 22 is adjusted, the electro-optic crystal layer 32 is laminated on the intermediate layer 22 of the silicon photonics component 20A.

FIG. 10A is a schematic cross-sectional view illustrating an example of the second optical waveguide formation process. After the electro-optic crystal layer 32 is laminated on the intermediate layer 22 of the silicon photonics component 20A, the second optical waveguide 32A is formed on the electro-optic crystal layer 32.

FIG. 10B is a schematic cross-sectional view illustrating an example of the second cladding layer formation process, the electrode formation process, and the via formation process. After the second optical waveguide 32A is formed, the second cladding layer 33 is laminated on the electro-optic crystal layer 32. Further, after the second cladding layer 33 is laminated, the signal electrode 34A and the ground electrode 34B are arranged on the second cladding layer 33 on which the second optical waveguide 32A is arranged in the Mach-Zehnder interferometer 3A. Furthermore, the vias 35 are formed in the second cladding layer 33, the electro-optic crystal layer 32, the intermediate layer 22, and the buffer layer 23 such that the metal wire 4A2 of the phase control element 4 and the metal wire 5A2 of the light receiving element 5 in the silicon photonics component 20A are exposed from the second cladding layer 33, so that the optical device 1 is formed.

In the optical device 1 according to the present embodiment, the second substrate 31 with higher resistivity than the first substrate 21 is adopted, so that it is possible to avoid a situation in which the modulation bandwidth of the optical modulators 3 is deteriorated, for example. Furthermore, in the optical device 1, the thickness of the intermediate layer 22 is adjusted and the distance L between the electro-optic crystal layer 32 and the first optical waveguide 2 is reduced, so that it is possible to improve optical coupling efficiency between the first optical waveguide 2 and the second optical waveguide 32A.

The optical device 1 includes the first optical waveguide 2 that is formed in the first cladding layer 24 at a side opposite to the second substrate 31 in the first cladding layer 24, the electro-optic crystal layer 32 that is laminated on a surface of the first cladding layer 24 at a side opposite to the second substrate 31, and the second optical waveguide 32A that is formed of the electro-optic crystal layer 32 on a surface of the electro-optic crystal layer 32 at a side opposite to the first cladding layer 24. As a result, the distance L between the electro-optic crystal layer 32 and the first optical waveguide 2 is reduced, so that it is possible to improve optical coupling efficiency between the first optical waveguide 2 and the second optical waveguide 32A. Furthermore, it is possible to realize an optical device that can reduce a loss and that is suitable for mass production while simultaneously using high integration of silicon photonics and high modulation characteristics of a crystal with the electro-optic effect.

In the optical device 1, even if the silicon photonics component 20 in which, for example, the phase control elements 4 and the light receiving element 5 are incorporated is used, it is possible to integrate the LN optical modulators 3 in the silicon photonics component 20, so that it is possible to provide the optical device 1 that implements different functions depending on silicon elements to be integrated.

The first optical waveguide 2 is formed on a surface of the intermediate layer 22 that comes into contact with the buffer layer 23, and the electro-optic crystal layer 32 is laminated on a surface of the intermediate layer 22 at a side opposite to the buffer layer 23. Therefore, the distance L between the electro-optic crystal layer 32 and the first optical waveguide 2 is reduced, so that it is possible to improve optical coupling efficiency between the first optical waveguide 2 and the second optical waveguide 32A.

At least one silicon component, e.g., the silicon components 4 and 5, are further arranged in the first cladding layer 24 between the first optical waveguide 2 and the second substrate 31. As a result, it is possible to maintain high integration.

Each of the optical modulators 3 includes the electrode 34 that is arranged on a surface of the second cladding layer 33 at a side opposite to the electro-optic crystal layer 32 and that applies an electrical signal to the second optical waveguide 32A, and the second substrate 31 is a substrate with resistivity of equal to or larger than 1000 Ωcm. Thus, the second substrate 31 with higher resistivity than the first substrate 21 is adopted, so that it is possible to avoid a situation in which the modulation bandwidth of the optical modulators 3 is deteriorated, for example.

The signal electrode 34A and the ground electrode 34B are arranged on a surface of the second cladding layer 33 at a side opposite to the electro-optic crystal layer 32 so as to apply an electric signal in the horizontal direction in the second optical waveguide 32A when the electro-optic crystal layer 32 is X-cut. Therefore, the technology is applicable to the optical modulator 3 that includes the X-cut electro-optic crystal layer 32.

Meanwhile, for convenience of explanation, the X-cut LN electro-optic crystal layer 32 is described as an example, but the technology is applicable to the optical device 1 that uses the Z-cut LN electro-optic crystal layer 32. The optical device 1 includes the Z-cut LN electro-optic crystal layer 32, and the second optical waveguide 32A that is formed on the electro-optic crystal layer 32 along an X direction or a Y direction of a crystal axis of the electro-optic crystal layer 32. In the case of the electro-optic crystal layer 32 whose refractive index is changed by application of an electric field in the vertical (Z) direction, the electro-optic crystal layer 32 arranges the signal electrode 34A just above the second optical waveguide 32A to apply the electric field in the vertical direction of the second optical waveguide 32A. In this case, the ground electrode 34B may be embedded in the second cladding layer 33. Further, the buffer layer 23 may be formed between the second optical waveguide 32A and the signal electrode 34A. For example, by forming the buffer layer 23 using $SiO_2$, it is possible to reduce an electrode absorption loss of a propagating optical signal even if the signal electrode 34A is located just above the second optical waveguide 32A.

Furthermore, while the electro-optic crystal layer 32 is described as one example, a material of the electro-optic crystal is not limited to LN, and any kind of electro-optic crystal is applicable. For example, perovskite oxides, such as lead zirconate titanate (PZT), lanthanum-doped lead zirconate-lead titanate (PLZT), or barium titanate (BaTiO$_3$), may be applicable, and an appropriate change is acceptable. Meanwhile, the Pockels coefficient of PZT is about 110 pm/V, the Pockels coefficient of PLZT is about 700 pm/V, and the Pockels coefficient of BaTiO$_3$ is about 1850 pm/V, and therefore, the Pockels coefficient of an electro-optic crystal applied to the present invention is a material with the coefficient in a range of 10 to 2000 pm/V.

Further, the example has been described in which the first optical waveguide 2 and the second optical waveguide 32A are ridge waveguides, but embodiments are not limited to the ridge waveguide, but the technology is applicable to, for example, a channel waveguide.

FIG. 11A is a schematic plan view illustrating an example of an optical device 1A in which the optical modulator 3 is incorporated. Meanwhile, the same components as those of the optical device 1 illustrated in FIG. 1 are denoted by the same reference symbols, and explanation of the same components and operation will be omitted. The optical device 1A illustrated in FIG. 11A includes the optical modulator 3 and the two phase control elements 4. The optical modulator 3 includes the branching unit 12, the two Mach-Zehnder interferometers 3A, and the multiplexing unit 13. For example, a portion of each of the Mach-Zehnder interferometers 3A includes the second substrate 31, the buffer layer 23, the intermediate layer 22, the first optical waveguide 2, the electro-optic crystal layer 32, the second optical waveguide 32A, the second cladding layer 33, and the electrode 34. A portion of each of the phase control elements 4 includes the second substrate 31, the buffer layer 23, the intermediate layer 22, the first optical waveguide 2, the phase control element 4, the electro-optic crystal layer 32, and the second cladding layer 33. Therefore, in the optical device 1A in which the optical modulator 3 is incorporated as illustrated in FIG. 11A, it is possible to maintain high integration of silicon photonics, improve optical coupling efficiency between the first optical waveguide 2 and the second optical waveguide 32A, and prevent deterioration of the modulation bandwidth.

Figure 11B:
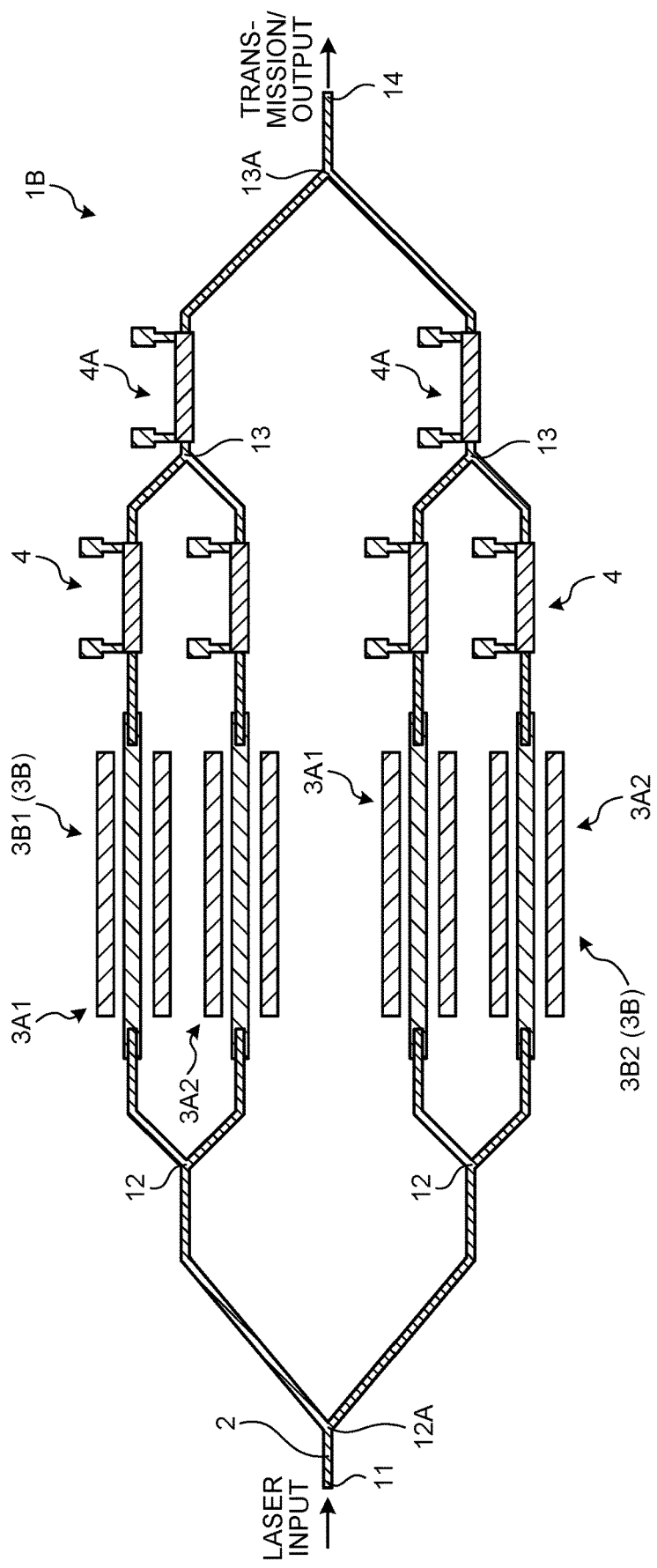
FIG. 11B is a schematic plan view illustrating an example of a configuration of an IQ optical modulator.

FIG. 11B is a schematic plan view illustrating an example of an optical device 1B in which IQ optical modulators 3B are incorporated. The same components as those of the optical device 1A illustrated in FIG. 11A are denoted by the same reference symbols, and explanation of the same configuration and operation will be omitted. The IQ optical modulators 3B in the optical device 1B illustrated in FIG. 11B include a first branching unit 12A, an optical modulator 3B1 for inphase (I) component, an optical modulator 3B2 for quadrature (Q) component, two first phase control elements 4A, and a first multiplexing unit 13A. The optical modulator 3B1 for I component performs phase modulation on an optical signal of I component. The optical modulator 3B2 for Q component performs phase modulation on an optical signal of Q component. The optical modulator 3B1 for I component includes the branching unit 12, two Mach-Zehnder interferometers 3A1 (3A2), and the multiplexing unit 13. The optical modulator 3B2 for Q component includes the branching unit 12, the two Mach-Zehnder interferometers 3A1 (3A2), and the multiplexing unit 13.

The first branching unit 12A optically splits signal light coming from the first optical waveguide 2 and outputs the optically-split signal light to each of the IQ optical modulators 3B. The optical modulator 3B1 for I component outputs the signal light, which is subjected to phase modulation on I component and which comes from the multiplexing unit 13 in the optical modulator 3B1, to the first phase control element 4A. The first phase control element 4A shifts a phase of the signal light that has been subjected to the phase modulation on I component, and outputs the signal light of I component subjected to the phase shift to the first multiplexing unit 13A.

Further, the optical modulator 3B2 for Q component outputs the signal light, which is subjected to phase modulation on Q component and which comes from the multiplexing unit 13 in the optical modulator 3B2, to the first phase control element 4A. The first phase control element 4A shifts a phase of the signal light that has been subjected to the phase modulation on Q component, and outputs the signal light of Q component subjected to the phase shift to the first multiplexing unit 13A. The first multiplexing unit 13A multiplexes the signal light of I component and the signal light of Q component, and outputs the multiplexed signal light of IQ component to the output unit 14.

For example, a portion of the Mach-Zehnder interferometer 3A1 (3A2) includes the second substrate 31, the buffer layer 23, the intermediate layer 22, the first optical waveguide 2, the electro-optic crystal layer 32, the second optical waveguide 32A, the second cladding layer 33, and the electrode 34. A portion of the phase control element 4 (the first phase control element 4A) includes the second substrate 31, the buffer layer 23, the intermediate layer 22, the first optical waveguide 2, the phase control element 4 (the first phase control element 4A), the electro-optic crystal layer 32, and the second cladding layer 33. Therefore, in the optical device 1B in which the IQ optical modulators 3B are incorporated as illustrated in FIG. 11B, it is possible to maintain high integration of silicon photonics, improve optical coupling efficiency between the first optical waveguide 2 and the second optical waveguide 32A, and prevent deterioration of the modulation bandwidth.

FIG. 11C is a schematic plan view illustrating an example of a configuration of DP-IQ optical modulators 3C. The same components as those of the optical device 1B illustrated in FIG. 11B are denoted by the same reference symbols, and explanation of the same configuration and operation will be omitted. The DP-IQ optical modulators 3C in an optical device 1C illustrated in FIG. 11C include a second branching unit 12B, IQ optical modulator 3C1 for X-polarization component, an IQ optical modulator 3C2 for Y-polarization component, a polarization rotator (PR) 15, and a polarization beam combiner (PBC) 16.

The second branching unit 12B optically splits signal light coming from the first optical waveguide 2 and outputs the optically-split signal light to each of the IQ optical modulators 3C1 and 3C2. The IQ optical modulator 3C1 for X-polarization component includes the optical modulator 3B1 for I component of X-polarization component, and the optical modulator 3B2 for Q component of X-polarization component.

The first multiplexing unit 13A in the IQ optical modulator 3C1 for X-polarization component multiplexes the signal light of I component of X-polarization component coming from the multiplexing unit 13 in the optical modulator 3B1 for I component and the signal light of Q component of X-polarization component coming from the multiplexing unit 13 in the optical modulator 3B2 for Q component, and outputs the signal light of IQ component of X-polarization component to the PBC 16.

The first multiplexing unit 13A in the IQ optical modulator 3C2 for Y polarization multiplexes the signal light of I component of Y-polarization component coming from the multiplexing unit 13 in the optical modulator 3B2 for I component and the signal light of Q component of Y-polarization component coming from the multiplexing unit 13 in the optical modulator 3B2 for Q component, and outputs the signal light of IQ component of the Y-polarization component to the PR 15. The PR 15 performs polarization rotation on the signal light of IQ component of Y-polarization component, and outputs the signal light of IQ component of Y-polarization component subjected to the polarization rotation to the PBC 16. The PBC 16 multiplexes the signal light of IQ component of X-polarization component and the signal light of IQ component of Y-polarization component subjected to the polarization rotation, and outputs the multiplexed signal light of XY-polarization component to the output unit.

For example, a portion of the Mach-Zehnder interferometer 3A1 (3A2) in the DP-IQ optical modulator 3C includes the second substrate 31, the buffer layer 23, the intermediate layer 22, the first optical waveguide 2, the electro-optic crystal layer 32, the second optical waveguide 32A, the second cladding layer 33, and the electrode 34. A portion of the phase control element 4 (the first phase control element 4A) includes the second substrate 31, the buffer layer 23, the intermediate layer 22, the first optical waveguide 2, the phase control element 4 (the first phase control element 4A), the electro-optic crystal layer 32, and the second cladding layer 33. Further, a portion of each of the PR 15 and the PBC 16 includes the second substrate 31, the buffer layer 23, the intermediate layer 22, the first optical waveguide 2, the PR 15, the PBC 16, the electro-optic crystal layer 32, and the second cladding layer 33. Therefore, in the optical device 1C in which the DP-IQ optical modulators 3C are incorporated as illustrated in FIG. 11C, it is possible to maintain high integration of silicon photonics, improve optical coupling efficiency between the first optical waveguide 2 and the second optical waveguide 32A, and prevent deterioration of the modulation bandwidth.

Figure 11D:
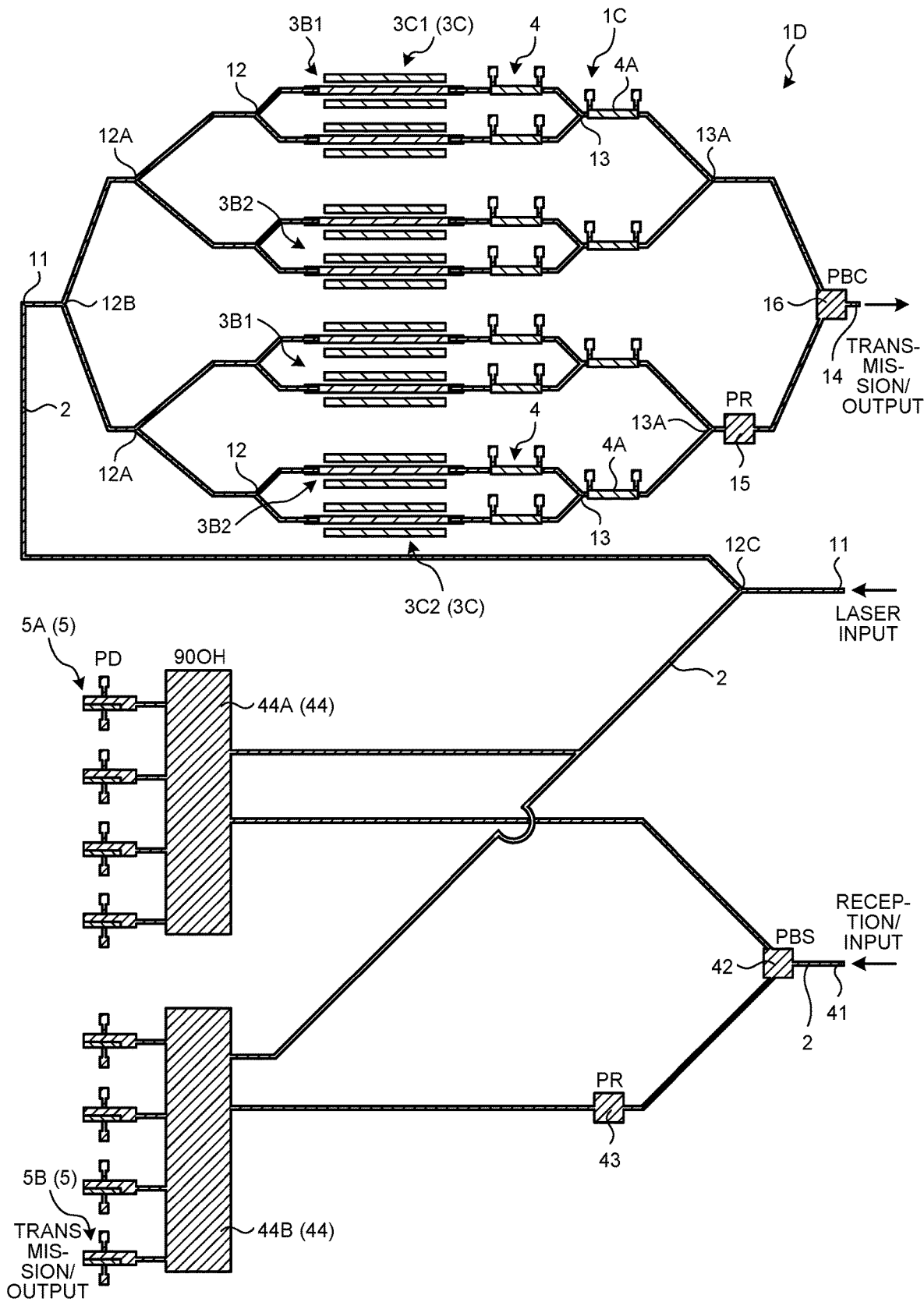
FIG. 11D is a schematic plan view illustrating an example of a configuration of an optical communication device.

FIG. 11D is a schematic plan view illustrating an example of a configuration of an optical communication device 1D. Meanwhile, the same components as those of the DP-IQ optical modulators 3C illustrated in FIG. 11C are denoted by the same reference symbols, and explanation of the same configuration and operation will be omitted. The optical communication device 1D illustrated in FIG. 11D includes DP-IQ optical modulators 3C, a third branching unit 12C, a light-receiving input unit 41, a polarization beam splitter (PBS) 42, a PR 43, a first optical hybrid circuit 44A (44), a second optical hybrid circuit 44B (44), four light receiving elements 5A, and four light receiving elements 5B.

The third branching unit 12C optically splits local light from a light source (not illustrated) via the input unit 11, and outputs the optically-split light to the DP-IQ optical modulators 3C and each of the hybrid circuits 44. The light-receiving input unit 41 receives input of reception light from an optical fiber (not illustrated). The PBS 42 splits the light coming from the light-receiving input unit 41 into X-polarization reception light and Y-polarization reception light, outputs the X-polarization reception light to the first optical hybrid circuit 44A, and outputs the Y-polarization reception light to the PR 43. The PR 43 performs 90-degree polarization rotation on the Y-polarization reception light, and outputs the Y-polarization reception light subjected to the polarization rotation to the second optical hybrid circuit 44B.

The first optical hybrid circuit 44A causes locally-emitted light to interfere with X-polarization component of the reception light, and acquires an optical signal of I component and an optical signal of Q component. The first optical hybrid circuit 44A outputs the optical signal of I component in X-polarization component to the light receiving element 5A. The first optical hybrid circuit 44A outputs the optical signal of Q component in X-polarization component to the light receiving element 5A.

The second optical hybrid circuit 44B causes locally-emitted light to interfere with Y-polarization component of the reception light, and acquires an optical signal of I component and an optical signal of Q component. The second optical hybrid circuit 44B outputs the optical signal of I component in Y-polarization component to the light receiving element 5B. The second optical hybrid circuit 44B outputs the optical signal of Q component in Y-polarization component to the light receiving element 5B.

The light receiving element 5A performs electrical conversion on the optical signal of I component of X-polarization component coming from the first optical hybrid circuit 44A, and outputs the electrical signal of I component subjected to the electrical conversion. Further, the light receiving element 5A performs electrical conversion on the optical signal of Q component of X-polarization component coming from the first optical hybrid circuit 44A, and outputs the electrical signal of Q component subjected to the electrical conversion. The light receiving element 5B performs electrical conversion on the optical signal of I component of Y-polarization component coming from the second optical hybrid circuit 44B, and outputs the electrical signal of I component subjected to the electrical conversion. The light receiving element 5B performs electrical conversion on the optical signal of Q component of Y-polarization component coming from the second optical hybrid circuit 44B, and outputs the electrical signal of Q component subjected to the electrical conversion.

For example, a portion of the Mach-Zehnder interferometer 3A1 (3A2) in the DP-IQ optical modulators 3C includes the second substrate 31, the buffer layer 23, the intermediate layer 22, the first optical waveguide 2, the electro-optic crystal layer 32, the second optical waveguide 32A, the second cladding layer 33, and the electrode 34. A portion of the phase control element 4 (the first phase control element 4A) includes the second substrate 31, the buffer layer 23, the intermediate layer 22, the first optical waveguide 2, the phase control element 4 (the first phase control element 4A), the electro-optic crystal layer 32, and the second cladding layer 33. Further, a portion of each of the PR 15 and the PBC 16 includes the second substrate 31, the buffer layer 23, the intermediate layer 22, the first optical waveguide 2, the PR 15, the PBC 16, the electro-optic crystal layer 32, and the second cladding layer 33.

A portion of the light receiving element 5 includes the second substrate 31, the buffer layer 23, the intermediate layer 22, the first optical waveguide 2, the light receiving element 5, the electro-optic crystal layer 32, and the second cladding layer 33. Further, a portion of each of the PR 43 and the PBS 42 includes the second substrate 31, the buffer layer 23, the intermediate layer 22, the first optical waveguide 2, the PR 43, the PBS 42, the electro-optic crystal layer 32, and the second cladding layer 33. Similarly, a portion of the hybrid circuit 44 includes the second substrate 31, the buffer layer 23, the intermediate layer 22, the first optical waveguide 2, the hybrid circuit 44, the electro-optic crystal layer 32, and the second cladding layer 33. Therefore, in the optical communication device 1D as illustrated in FIG. 11D, it is possible to maintain high integration of silicon photonics, improve optical coupling efficiency between the first optical waveguide 2 and the second optical waveguide 32A, and prevent deterioration of the modulation bandwidth.

According to one embodiment of the optical device or the like disclosed in the present application, it is possible to improve coupling efficiency while ensuring high integration of a silicon photonics component.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device comprising:
   a substrate;
   a first cladding layer that is laminated on one surface of the substrate;
   a first optical waveguide that is formed in the first cladding layer at a side opposite to the substrate in the first cladding layer;
   an electro-optic crystal layer that is laminated on a surface of the first cladding layer at a side opposite to the substrate;
   a second optical waveguide that is formed of the electro-optic crystal layer on a surface of the electro-optic crystal layer at a side opposite to the first cladding layer; and
   a second cladding layer that is laminated on a surface of the electro-optic crystal layer at a side opposite to the first cladding layer.

2. The optical device according to claim 1, wherein the first cladding layer includes
   a buffer layer that is laminated on one surface of the substrate; and
   an intermediate layer that is laminated on the buffer layer at a side opposite to the substrate,
   the first optical waveguide is formed on a surface of the intermediate layer, the surface coming into contact with the buffer layer, and
   the electro-optic crystal layer is laminated on a surface of the intermediate layer at a side opposite to the buffer layer.

3. The optical device according to claim 2, wherein a thickness of the intermediate layer that determines a distance between the first optical waveguide and the second optical waveguide is equal to or smaller than 1 micrometer (μm).

4. The optical device according to claim 1, further including:
   at least one silicon component that is arranged in the first cladding layer between the first optical waveguide and the substrate.

5. The optical device according to claim 4, wherein the silicon component is a light receiving element that electrically converts an optical signal that passes through the first optical waveguide.

6. The optical device according to claim 4, wherein the silicon component is a phase control element that controls a refractive index of the first optical waveguide by a heater that heats the first optical waveguide.

7. The optical device according to claim 1, further including:
   an electrode that is arranged on a surface of the second cladding layer at a side opposite to the electro-optic crystal layer, and applies an electrical signal to the second optical waveguide, wherein
   the substrate has resistivity of equal to or larger than 1000 Ωcm.

8. The optical device according to claim 7, wherein the electrode includes
   a signal electrode; and
   a ground electrode, and
   the signal electrode and the ground electrode are arranged on a surface of the second cladding layer at a side opposite to the electro-optic crystal layer such that when an axis along which an electro-optic effect of the electro-optic crystal layer most strongly appears extends in a horizontal direction, the electrical signal is applied in the horizontal direction in the second optical waveguide.

9. The optical device according to claim 7, wherein the electrode includes
   a signal electrode; and
   a ground electrode, and
   one of the signal electrode and the ground electrode is arranged in a portion above the second cladding layer on which the second optical waveguide is arranged when an axis along which an electro-optic effect of the electro-optic crystal layer most strongly appears extends in a vertical direction.

10. The optical device according to claim 1, wherein the Pockels coefficient of the electro-optic crystal layer falls in a range of 10 to 2000 pm/V.

* * * * *